United States Patent [19]

Konishi et al.

[11] Patent Number: 4,982,942

[45] Date of Patent: Jan. 8, 1991

[54] SHEET FEED MECHANISM

[75] Inventors: Hiroshi Konishi; Matsusaburo Noguchi; Joji Tadokoro; Noboru Otaki, all of Tokyo, Japan

[73] Assignee: Oki Electric Industry Co., Ltd., Tokyo, Japan

[21] Appl. No.: 362,267

[22] Filed: Jun. 6, 1989

[30] Foreign Application Priority Data

Jun. 8, 1988 [JP] Japan ............................ 63-76192[U]

[51] Int. Cl.$^5$ ............................................. B65H 3/06
[52] U.S. Cl. ...................................... 271/119; 271/121
[58] Field of Search ...................... 271/121, 124, 119

[56] References Cited

U.S. PATENT DOCUMENTS

| | | | |
|---|---|---|---|
| 1,986,800 | 1/1935 | Elliott | 271/119 X |
| 2,705,636 | 4/1955 | Bombard | |
| 3,563,537 | 2/1971 | Thut | 271/124 |
| 4,529,187 | 7/1985 | Einem | 271/116 X |
| 4,560,154 | 12/1985 | Nogi | 271/116 X |
| 4,638,987 | 1/1987 | Sakurai | |
| 4,674,737 | 6/1987 | Murayoshi | 271/124 |

FOREIGN PATENT DOCUMENTS

| | | |
|---|---|---|
| 2238480 | 2/1974 | Fed. Rep. of Germany . |
| 2263468 | 7/1974 | Fed. Rep. of Germany . |
| 2588538 | 4/1987 | France . |
| 1225883 | 3/1971 | United Kingdom . |

OTHER PUBLICATIONS

"Low Cost Bottom Feeder with Flexible Retard", Robb et al., Xerox Disclosure Journal, vol. 8, No. 3, May/Jun. 1983, pp. 197–198.

*Primary Examiner*—Richard A. Schacher
*Attorney, Agent, or Firm*—Spencer & Frank

[57] ABSTRACT

A sheet feed mechanism for feeding sheets one at a time, comprising a hopper loaded with a stack of sheets, a feed roller disposed near the outlet of the hopper, and a resilient tongue held in resilient contact with the central section of the feed roller. The central section of the feed roller is provided with an alternate circumferential arrangement of low friction portions and high friction portions. The friction coefficients between the sheet and the low friction portions is smaller than that between the sheet and the tongue, and the friction coefficient between the sheet and the high friction portions is greater than that between the sheet and the tongue.

3 Claims, 5 Drawing Sheets

SHEET FEED MECHANISM

BACKGROUND OF THE INVENTION

1. Field of the Invention

The present invention relates to a sheet feed mechanism for feeding a plurality of stacked sheets one at a time.

2. Description of the Related Art

Facsimile equipments and printers have each a hopper for accommodating a stack of a plurality of sheets, and a sheet feed mechanism for feeding the sheets one at a time from the hopper to feed the sheet for reading characters printed on the sheets or for printing characters on the sheet.

British Patent No. 1,225,883 discloses such a sheet feed mechanism, which comprises a hopper, a feed roller disposed adjacent to the outlet of the hopper so as to be in contact with the lowermost sheet, and a sheet restricting member disposed opposite to the feed roller. In feeding the sheets, the feed roller drives the lowermost sheet while the sheet restricting member restrains the rest of the sheets lying on the lowermost sheet in contact with the feed roller.

The sheet restricting member can be moved substantially perpendicularly to the sheets placed in the hopper. Accordingly, the width of a gap formed between the sheet restricting member and the feed roller at the outlet of the hopper can be varied according to the thickness of the sheets.

This sheet feed mechanism, however, has a problem that, in some cases, a sheet warped sideways driven by the feed roller interferes with the sheet restricting member. The width of the gap between the sheet restricting member and the feed roller must be increased to avoid the interference between the sheet and the sheet restricting member. However, increase in the width of the gap affects adversely the restricting function of the sheet restricting member, excessive increase in the width of the gap entails the feed of a plurality of superposed sheet at a time, which makes the normal printing operation of the printer or the normal character reading operation of the facsimile impossible.

SUMMARY OF THE INVENTION

Accordingly, it is an object of the present invention to provide a sheet feed mechanism capable of surely separating superposed sheets.

It is a further object of the present invention to provide a sheet feed mechanism having a sheet restricting member, capable of feeding various kinds of sheet without requiring the positional adjustment of the sheet restricting member.

To achieve the object, the present invention provides a sheet feed mechanism employing a feed roller having a surface of an alternate circumferential arrangement of high friction portions and low friction portions.

The present invention employs a resilient tongue pressed against the circumferential arrangement.

According to the present invention, materials forming the low friction portions of the feed roller, the high friction portions of the feed roller and the resilient tongue are decided selectively to meet a relation expressed by $$\mu_1 < \mu t < \mu_2$$

where $\mu_1$ is the friction coefficient between the sheet and the low friction portions, $\mu_2$ is the friction coefficient between the sheet and the high friction portions, and $\mu t$ is the friction coefficient between the sheet and the resilient tongue.

Furthermore, a drive roller is disposed on a sheet conveying path after the feed roller, and the drive roller is rotated at a surface speed substantially equal to that of the feed roller.

Thus, the sheet feed mechanism of the present invention is able to feed sheets smoothly without interfering with the sheet.

Furthermore, the sheet feed mechanism of the present invention separates superposed sheets surely and feeds the sheet one at a time.

Still further, the sheet feed mechanism of the present invention is capable of feeding various kinds of sheets without requiring any adjustment of the component parts.

The above and other objects, features and advantages of the present invention will become more apparent from the following description taken in conjunction with the accompanying drawings.

DESCRIPTION OF THE PREFERRED EMBODIMENT

Figure 1:
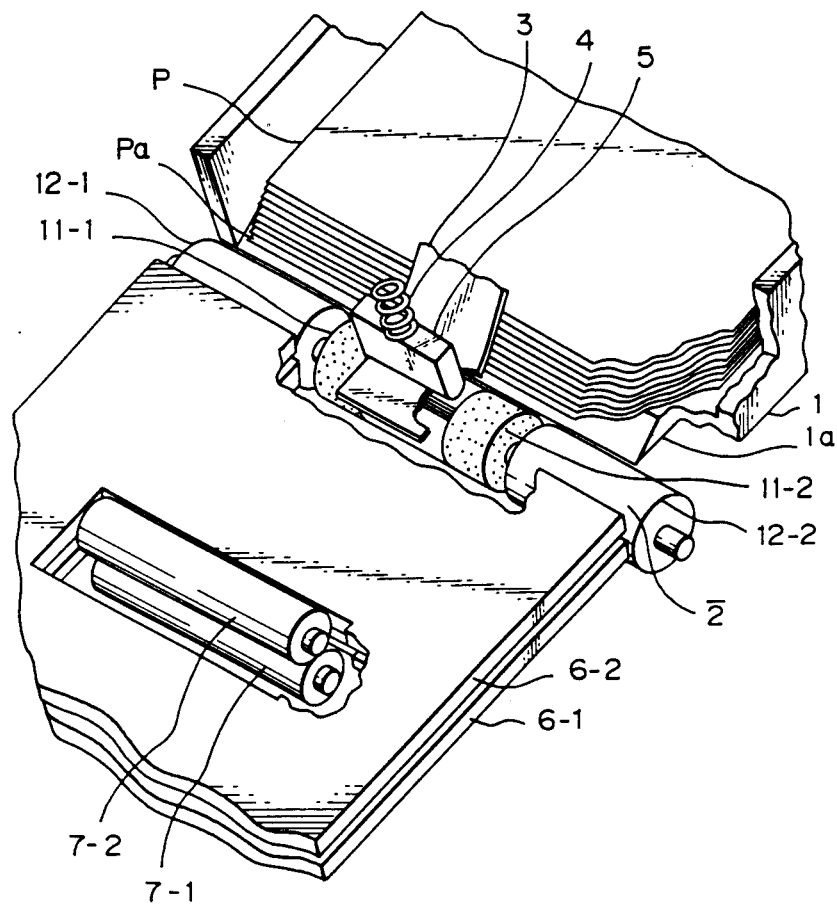
FIG. 1 is a perspective view of an essential portion of a sheet feed mechanism embodying the present invention.

With reference to FIG. 1, a hopper 1 has a bottom wall declining toward the front edge 1a thereof. The hopper 1 is loaded with sheets P. The sheets P are caused to slide downward by the force of gravity and the leading edges of the sheets P are in contact with a feed roller 2 disposed near the front edge 1a of the bottom wall of the hopper 1 or with a resilient tongue 3 placed in contact with the central portion of the feed roller 2.

The tongue 3 has one end pressed against the feed roller 2 with a pressing member 5 pressed against the tongue 3 with a spring 4 having one end attached to a frame, not shown. A portion of the tongue 3 in contact with the feed roller 2 presses the sheet P drawn out from the hopper 1 by the feed roller 2 against the feed roller 2 and applies a frictional resistance against the advancement of the sheet P. Another portion of the tongue 3 not in contact with the feed roller 2 holds the sheet P not in contact with the feed roller 2 in place on the hopper 1.

Guide plates 6-1 and 6-2 are extended with a gap therebetween after the feed roller 2 to guide the sheet P fed from the hopper 1 by the feed roller 2. A pair of drive rollers 7-1 and 7-2 each having an elastic circumference are disposed in slots formed in the guide plates 6-1 and 6-2 so as to be in contact with each other within the gap between the guide plates 6-1 and 6-2. The drive roller 7-1 is rotated in the same direction as the feed roller 2 while the drive roller 7-2 is rotated in a direction opposite the direction of rotation of the feed roller 2. The feed roller 2, the drive rollers 7-1 and 7-2 are rotated synchronously at the same surface speed to feed and convey the sheet P.

The feed roller 2 will be described in detail with reference to FIGS. 2 and 3.

Figure 2:
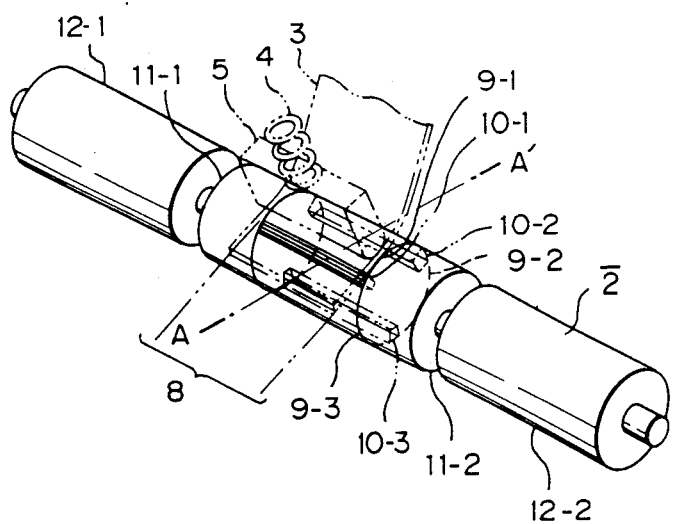
FIG. 2 is a perspective view of a feed roller shown in FIG. 1.

As shown in FIG. 2, the feed roller 2 has a central section 8 engaging the tongue 3. The circumference of the central section 8 has an alternate arrangement of axial low friction portions 9-1, 9-2 and 9-3 and axial high friction portions 10-1, 10-2 and 10-3. The low friction portions 9-1, 9-2 and 9-3 are formed of a low friction material, such as polyacetal. The high friction portions 10-1, 10-2 and 10-3 are formed of a high friction material, such as rubber. Sheet drag sections 11-1 and 11-2 are formed contiguously with the opposite ends of the central section 8, respectively. The circumferences of the sheet drag sections 11-1 and 11-2 are formed, for example, of silicon rubber. When the leading edge $P_a$ of the sheet P reaches the rotating feed roller 2, the sheet drag sections 11-1 and 11-2 direct the leading edge $P_a$ of the sheet P toward the tongue 3. Sheet support sections 12-1 and 12-2 are formed contiguously with the respective outer ends of the sheet drag sections 11-1 and 11-2, respectively. The circumferences of the sheet support sections 12-1 and 12-2 are formed, for example, of polyacetal. The sheet support sections 12-1 and 12-2 prevent the sheet P from curling and guides the sheet P into the gap between the guide plates 6-1 and 6-2. The central section 8, the sheet drag sections 11-1 and 11-2 and the sheet support sections 12-1 and 12-2 are substantially the same in diameter.

Figure 3:
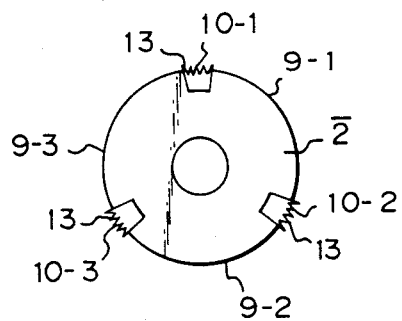
FIG. 3 is a sectional view taken on line A-A' in FIG. 2.

Referring to FIG. 3, axial fine furrows 13 are formed in the contact surfaces of the high friction portions 10-1, 10-2 and 10-3. The furrows 13 are formed in the contact surfaces to secure a sufficient frictional driving action of the high friction portions 10-1, 10-2 and 10-3 even if powdered paper sticks to the high friction portions 10-1, 10-2 and 10-3.

The low friction portions 9-1, 9-2 and 9-3, the high friction portions 10-1, 10-2 and 10-3, and the tongue 3 are formed of materials meeting a relation expressed by $$\mu_1 < \mu t < \mu_2$$

where $\mu_1$ is the friction coefficient between the low friction portions 9-1, 9-2 and 9-3 and the sheet P, $\mu_2$ is the friction coefficient between the high friction portions 10-1, 10-2 and 10-3 and the sheet P, and $\mu t$ is the friction coefficient between the tongue 3 and the sheet P.

The operation of the sheet feed mechanism will be described hereinafter.

Figure 4:
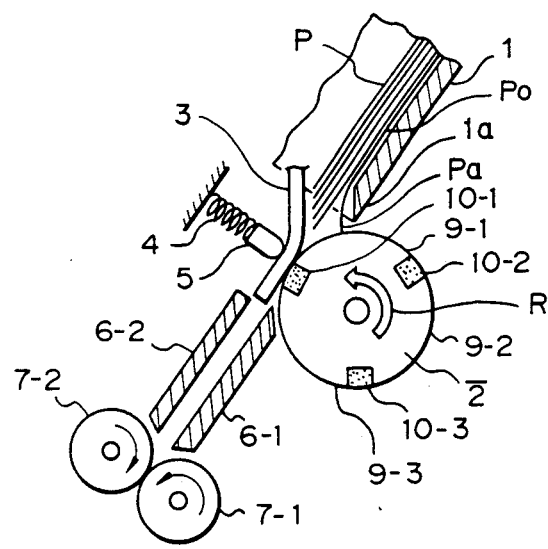
FIG. 4 is a fragmentary sectional view of the sheet feed mechanism of FIG. 1, loaded with sheets P.
Figure 5:
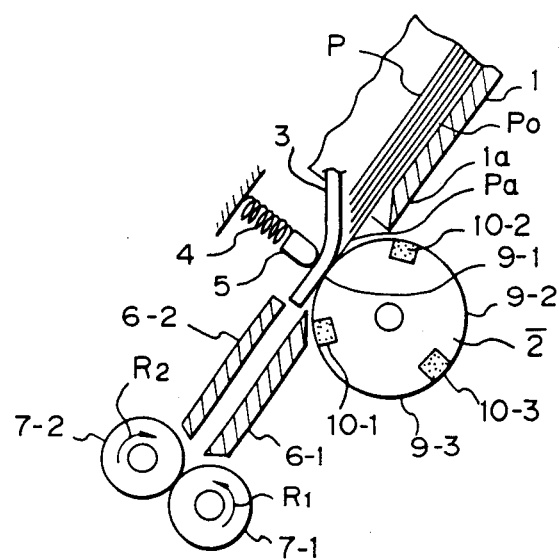
FIG. 5 is a fragmentary sectional view similar to FIG. 4, showing a state in which the leading edge $P_a$ of the lowermost sheet $P_0$ is caught between the feed roller and a tongue.

As shown in FIG. 4, the sheet P placed on the bottom wall of the hopper 1 are caused to slide downward by the force of gravity and the leading edges $P_a$ of the sheets P are in contact with the feed roller 2 or the tongue 3. As the feed roller 2 is rotated in the direction of an arrow R, the sheet drag sections 11-1 and 11-2 urges the lowermost sheet $P_0$ so that the leading edge $P_a$ of the lowermost sheet $P_0$ enter between the feed roller 2 and the tongue 3 as shown in FIG. 5. In this state, the tongue 3 applies a frictional resistance to the sheet $P_0$.

Figure 6A:
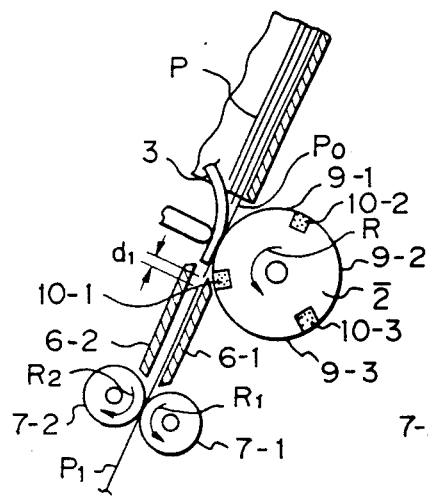
FIG. 6A is a fragmentary sectional view of the sheet feed mechanism of FIG. 1, showing a state in which the sheet $P_0$ is in contact with a low friction portion of the feed roller.
Figure 6B:
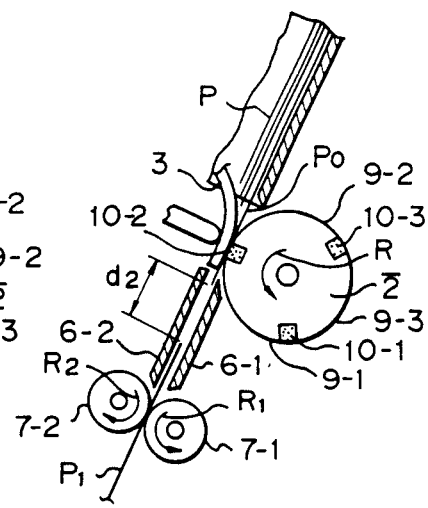
FIG. 6B is a fragmentary sectional view similar to FIG. 6A, showing a state in which the sheet $P_0$ is in contact with a high friction portion of the feed roller.

When the low friction portion 9-1, 9-2 or 9-3 engages the sheet $P_0$ as shown in FIG. 6A, the sheet $P_0$ remains stationary, because $\mu_1 < \mu t$ and hence the frictional resistance of the tongue 3 is greater than the frictional driving force of the feed roller. When the high friction portion 10-1, 10-2 or 10-3 engages the sheet $P_0$ as shown in FIG. 6B, the sheet $P_0$ is advanced, because $\mu_1 < \mu t$ and hence the frictional driving force of the feed roller 2 is greater than the frictional resistance of the tongue 3.

The pair of drive rollers 7-1 and 7-2 disposed after the feed roller 2 are rotated synchronously with the feed roller 2 at the same surface speed as the feed roller 2 respectively in directions indicated by arrows $R_1$ and $R_2$ in FIG. 5.

The sheet separating function of the sheet feed mechanism will be described hereinafter.

When the low friction portion 9-1 is in contact with the sheet $P_0$ and the preceding sheet $P_1$ is caught between the drive rollers 7-1 and 7-2 as shown in FIG. 6A, the succeeding sheet $P_0$ is held stationary by the frictional resistance of the tongue 3 while the preceding sheet $P_1$ is advanced by the drive rollers 7-1 and 7-2, and hence the distance $d_1$ between the leading edge of the succeeding sheet $P_0$ and the trailing edge of the preceding sheet $P_1$ increases gradually as the drive roller 7-1 and 7-2 rotate.

In a state where the high friction portion 10-2 is in contact with the sheet $P_0$ and the preceding sheet $P_1$ is caught between the drive rollers 7-1 and 7-2 as shown in FIG. 6B, the succeeding sheet $P_0$ is advanced by the feed roller 2 while the preceding sheet $P_1$ is advanced by the drive rollers 7-1 and 7-2 and hence the distance between the leading edge of the succeeding sheet $P_0$ and the trailing edge of the preceding sheet $P_1$ is kept substantially at a constant distance $d_2$ ($d_1$ $d_2$).

Figure 6C:
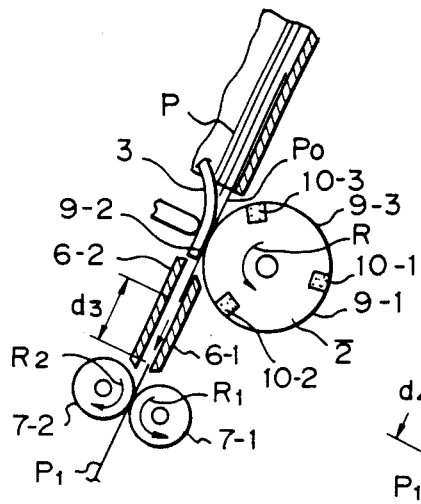
FIG. 6C is a fragmentary sectional view similar to FIG. 6A, showing a state in which the sheet $P_0$ is in contact with another low friction portion of the feed roller.

In a state where the low friction portion 9-2 is in contact with the sheet $P_0$ and the preceding sheet $P_1$ is caught between the drive rollers 7-1 and 7-2 as shown in FIG. 6C, the succeeding sheet $P_0$ is held stationary by the frictional resistance of the tongue 3 while the preceding sheet $P_1$ is advanced by the drive rollers 7-1 and 7-2 and hence the distance $d_3$ between the leading edge of the succeeding sheet $P_0$ and the trailing edge of the preceding sheet $P_1$ increases gradually.

Figure 6D:
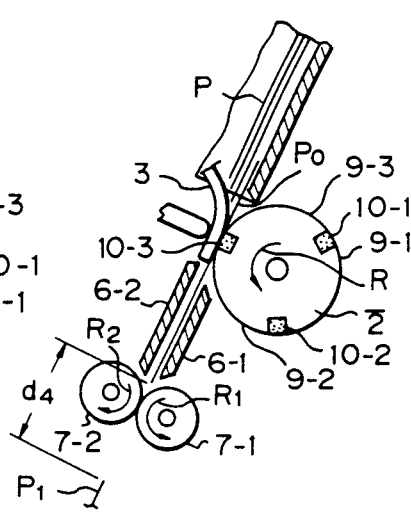
FIG. 6D is a fragmentary sectional view similar to FIG. 6A, showing a state in which the sheet $P_0$ is in contact with another high friction portion of the feed roller.

In a state where the high friction portion 10-3 is in contact with the sheet $P_0$ and the trailing edge of the preceding sheet $P_1$ has advanced beyond the drive rollers 7-1 and 7-2 as shown in FIG. 6D, the sheet $P_0$ is advanced by the feed roller 2 while the preceding sheet $P_1$ is advanced at the same speed as the succeeding sheet $P_0$ by another sheet feed mechanism, not shown, and hence the distance between the leading edge of the succeeding sheet $P_0$ and the trailing edge of the preceding sheet $P_1$ is kept substantially at a constant distance $d_4$ ($d_3$ $d_4$).

Thus, the sheet feed mechanism of the present invention separates the sheets P from each other to feed the sheets P surely one at a time.

While the sheets P are fed successively, the sheet support sections 12-1 and 12-2 prevent the sheets P from curling so that the curled portion of the sheet P will not be folded between the drive rollers 7-1 and 7-2 and the sheet P will not be checked by the drive rollers 7-1 and 7-2.

Although the invention has been described in its preferred form with a certain degree of particularity, it is to be understood that many variations and changes are possible in the invention without departing from the scope thereof.

What is claimed is:

1. A sheet feed mechanism comprising:
a hopper loaded with a stack of sheets;
a feed roller disposed near the outlet of the hopper in contact with the sheets stacked in the hopper, said feed roller having a central section and sheet drag sections respectively on the opposite ends of the central station,
a resilient tongue pressed against the central section of the feed roller on a sheet conveying path;
the central section of the feed roller being provided with an alternate circumferential arrangement of axial low friction portions and axial high friction portions meeting a relaxation expressed by $$\mu_1 < \mu t < \mu_2$$

where $\mu_1$ is the friction coefficient between the sheet and the low friction portions, $\mu_2$ is the friction coefficient between the sheet and the high friction portions, and $\mu t$ is the friction coefficient between the sheet and the tongue; and a pair of drive rollers are disposed on the sheet conveying path after the feed roller with respect to a sheet feed direction, the surface speed of the drive rollers being substantially the same as that of the feed roller.

2. A sheet feed mechanism according to claim 1, wherein the feed roller has sheet support sections respectively outside the sheet drag sections.

3. A sheet feed mechanism according to claim 2, wherein the contact surfaces of the high friction portions are provided each with axial furrows.

* * * * *